(12) United States Patent
Berendsen et al.

(10) Patent No.: US 10,149,425 B2
(45) Date of Patent: Dec. 11, 2018

(54) SEED METER FOR A SINGLE-GRAIN SEEDER

(71) Applicant: LEMKEN GmbH & Co. KG, Alpen (DE)

(72) Inventors: Mark Berendsen, Lengel (NL); Dennis Bergerfurth, Rees (DE); Martin Gebbeken, Alpen (DE); Marcel Geraats, Nettetal (DE); Christian Gotzen, Viersen (DE); Thomas Lukas, Ahaus-Wuellen (DE); Christian Paessens, Issum (DE); Dieter Werries, Alpen (DE)

(73) Assignee: LEMKEN GMBH & CO. KG., Alpen (DE)

( * ) Notice: Subject to any disclaimer, the term of this patent is extended or adjusted under 35 U.S.C. 154(b) by 16 days.

(21) Appl. No.: 15/029,893

(22) PCT Filed: Oct. 15, 2014

(86) PCT No.: PCT/DE2014/100367
§ 371 (c)(1),
(2) Date: Aug. 8, 2016

(87) PCT Pub. No.: WO2015/055180
PCT Pub. Date: Apr. 23, 2015

(65) Prior Publication Data
US 2016/0262302 A1    Sep. 15, 2016

(30) Foreign Application Priority Data
Oct. 15, 2013 (DE) .................. 10 2013 111 356

(51) Int. Cl.
*A01C 7/04* (2006.01)
*A01C 7/18* (2006.01)
(Continued)

(52) U.S. Cl.
CPC .............. *A01C 7/046* (2013.01); *A01C 5/062* (2013.01); *A01C 7/044* (2013.01)

(58) Field of Classification Search
CPC ......... A01C 7/042; A01C 7/044; A01C 7/046; A01C 21/005
See application file for complete search history.

(56) References Cited

U.S. PATENT DOCUMENTS

| 4,037,755 A * | 7/1977 | Reuter .................. A01C 7/044 111/174 |
| 5,231,940 A * | 8/1993 | Tjeerdsma ............. A01C 7/044 111/179 |

(Continued)

FOREIGN PATENT DOCUMENTS

| AR | 076078 A1 | 5/2011 |
| AT | 404042 T | 8/2008 |

(Continued)

*Primary Examiner* — Christopher J. Novosad
(74) *Attorney, Agent, or Firm* — HM Law Group LLP; Vani Moodley, Esq.

(57) ABSTRACT

A pneumatic precision seed drill has a multiplicity of seeding hearts 1 for holding pivoting separating devices 3 exposed to a pressure difference between their inner space 21 and their exterior space 22. A multiplicity of holes 17-20 intended for the accumulation of seeds is arranged in the device 3. The separating device 3 is formed by a pair of separating plates 4, 5 connected to one another at their outer edge 38, 39 that are arranged offset in a tangential direction to one another to produce a spread seed row and are assigned to separate outlets 23, 24 for the discharge of the seed from the seeding heart 1 in the direction of the sowing coulter.

21 Claims, 6 Drawing Sheets (51) Int. Cl.
    *A01C 7/20*           (2006.01)
    *A01C 5/06*           (2006.01)

(56) References Cited

U.S. PATENT DOCUMENTS

| | | | |
|---|---|---|---|
| 6,516,733 B1 * | 2/2003 | Sauder | A01C 7/044 |
| | | | 111/180 |
| 6,748,885 B2 | 6/2004 | Sauder et al. | |
| 7,393,476 B2 | 7/2008 | Shiozaki et al. | |
| 7,448,334 B2 | 11/2008 | Mariman et al. | |
| 8,418,634 B2 | 4/2013 | Shoup | |
| 8,789,483 B2 * | 7/2014 | Gilstring | A01C 7/044 |
| | | | 111/179 |
| 9,010,258 B1 * | 4/2015 | Richard | A01C 7/044 |
| | | | 111/179 |
| 9,750,178 B2 * | 9/2017 | Kinzenbaw | A01C 21/005 |
| 2003/0116068 A1 | 6/2003 | Sauder et al. | |
| 2010/0224110 A1 | 9/2010 | Mariman | |
| 2011/0219994 A1 | 9/2011 | Gilstring | |

FOREIGN PATENT DOCUMENTS

| | | | |
|---|---|---|---|
| AU | 2002364570 A1 | 7/2003 | |
| AU | 2010200768 A1 | 9/2010 | |
| CA | 2743506 A1 | 5/2010 | |
| CA | 2693878 A1 | 9/2010 | |
| CN | 2899419 Y | 5/2007 | |
| CN | 201204804 Y | 3/2009 | |
| CN | 100492728 C | 5/2009 | |
| CN | 201480038864 | 7/2014 | |
| DE | 102005038155 A1 | 2/2007 | |
| DE | 102006031272 A1 | 10/2007 | |
| DE | 2022006031272 A | 10/2007 | |
| DE | 102009043881 A1 | 3/2011 | |
| EP | 1752028 A1 | 2/2007 | |
| EP | 1842413 | 10/2007 | |
| EP | 2067396 A1 * | 6/2009 | A01C 7/044 |
| EP | 2225928 A2 | 9/2010 | |
| EP | 2225928 B1 | 9/2010 | |
| EP | 2375880 A1 | 10/2011 | |
| EP | 2502480 A1 * | 9/2012 | A01C 7/044 |
| EP | 2202828 B1 | 12/2013 | |
| EP | 2006937 A4 | 6/2014 | |
| EP | 20140823282 | 7/2014 | |
| EP | 3208872 A4 | 5/2018 | |
| FR | 2641441 A1 * | 7/1990 | A01C 7/044 |
| JP | S58-000802 A | 1/1983 | |
| JP | S58-029206 U1 | 2/1983 | |
| JP | H10324758 A | 12/1998 | |
| JP | 2000030686 A | 1/2000 | |
| JP | 2001076724 A | 1/2001 | |
| JP | 2002201028 A | 7/2002 | |
| JP | 2008103308 A | 5/2008 | |
| JP | 2009152188 A | 7/2009 | |
| JP | 4556377 B2 | 10/2010 | |
| JP | 2010278015 A | 12/2010 | |
| JP | 2011029132 A | 2/2011 | |
| JP | 2011105588 A | 6/2011 | |
| JP | 2011228292 A | 11/2011 | |
| JP | 2012234766 A | 11/2012 | |
| JP | 2013144947 A | 7/2013 | |
| JP | 5447248 B2 | 3/2014 | |
| KR | 100727332 B1 | 6/2007 | |
| KR | 20157034394 A | 7/2014 | |
| RU | 2010106002 A | 8/2011 | |
| WO | 03/055291 A2 | 7/2003 | |
| WO | 2003/055291 A2 | 7/2003 | |
| WO | 2009099158 A1 | 8/2009 | |
| WO | 2010/059101 A1 | 5/2010 | |
| WO | WO-2011031214 A1 * | 3/2011 | A01C 7/044 |
| WO | 2016133042 A1 | 8/2016 | |
| WO | 2016195036 A1 | 12/2016 | |

\* cited by examiner

SEED METER FOR A SINGLE-GRAIN SEEDER

FIELD

The invention concerns a pneumatic precision seed drill with a multiplicity of seeding hearts for holding pivoting separating devices exposed to a pressure difference between their inner space and their exterior space and having a multiplicity of holes serving for the accumulation of seeds.

In addition, the invention concerns a seeding heart for a pneumatic precision seed drill holding pivoting separating devices exposed to a pressure difference between their inner space and their exterior space and having a multiplicity of holes serving for the accumulation of seeds.

BACKGROUND

Pneumatic precision seed drills, such as those familiar from DE 10 2005 051 527 A1 for example, are used in agriculture to be able to plant seeds in the ground individually and at even distances. A special role is played here by the seeding hearts, which are arranged in several sowing rows in the machine next to one another. A seeding heart serves here to hold a separating device, such as, for example, a drum or a disc, on which a pressure difference is exercised between the interior and their exterior space for the purpose of accumulating and targeted discharge of the seed to the sowing coulter. However, previously known precision seed drills are not suitable for making spread seed rows at maximum speed and with optimum quality, that is, for making two offset double seed rows in a single pass.

The present invention is therefore faced with the task of creating a seeding heart for a pneumatic precision seed drill for use in agriculture that is suitable for the particularly fast, precise and effective generation of a spread seed row.

This task is solved in accordance with the invention in that the separating device is formed by a pair of separating plates joined to one another at their outer edge, that are arranged offset to one another in a tangential direction to generate a spread seed row and are assigned to separate outlets to discharge the seed from the seeding heart in the direction of the sowing coulter.

In a seeding heart for a precision seed drill of this type, a pair of separating plates joined to one another directly at their outer edge or through a wall running parallel to the rotation axis serves as a particularly precisely working separating device. In order to be able to form the spread seed row, the two separating plates are offset to one another in a tangential direction. The seeding heart has two outlets for discharging the seed from the seeding heart in the direction of the sowing coulter, whereby the seed from the left plate is shot into the corresponding left outlet and the seed from the right plate is shot into the corresponding right outlet. Insofar, the tangential offset between the two plates is coordinated to the arrangement of the two outlets.

It is particularly expedient if the two separating plates are arranged offset to one another to an extent that corresponds to half the spacing between two holes. In this way, the two plates are each aligned exactly to the two outlets seen from the seeding heart in the direction of the sowing coulter, in order to enable the formation of spread seed rows. In comparison with a separating drum, for example, a separating device with two plates is very compact, so that it can be accommodated completely in a housing. This leads to recognisable advantages, in particular because of the compressed air conditions.

SUMMARY

With regard to the structure of the separating plates, it is suggested in accordance with a first variant that the separating plates have an inside section running at least approximately parallel to the rotation plane of the plates and an outer section arranged slanted and having the holes. The end face of the plate therefore has an inner and an outer section, while the latter forms at the same time a part of the circumferential surface or merges into this. For the purpose of using the pressure difference between the inner and outer space of the plate pair it is important to produce a corresponding cavity between the plates. At the same time, a very central task of the invention consists of supporting the accumulation of the seed at or in the holes as well as guaranteeing targeted discharge after an interruption to the air flow.

Where the separating plates have an end face running parallel to the rotation plane of the plates and having holes, this represents another variant in which the separating plates also have sections or walls extending in the direction of the rotation axis. The two separating plates are then connected with each other in the area of these sections by suitable means.

If the central spacing of the outlets and/or the pipes connected to them corresponds at least approximately to the lateral spacing of the spread seed row, the seed is led preferably vertically downwards and without any appreciable collisions with the inner wall of the outlet or pipe into the area of the seed placement. The change in the direction of the seed inside the discharge pipe is reduced to a minimum and prevents unnecessary collision delays during seed transport, which at the same time considerably increases the placing accuracy within the seed row.

A particularly effective installation aid for two separating plates is realised if these can be connected in pairs via fasteners in such a way that the holes provided in facing separating plates are aligned offset to one another in the assembled condition. The arrangement of the fasteners distributed evenly over the edge of the plates, or the recesses provided for this purpose, practically permits assembly in this position only.

In order to guarantee fast and effective discharge of the seed through the two outlets, it is planned that the pair of separating plates is equipped with an interior mechanism for interrupting the air flow. This is, for example, a wheel supported on an arm. As soon as the wheel covers a hole on the plate from the inside, the air flow is interrupted, which releases the seed from the respective hole in the plate, so that it can be fed to the outlet to the sowing coulters.

A further preferred embodiment of the invention provides that the interior mechanism for interrupting the air flow supply is realised as a spring-mounted or at least partly elastic roller or as a spring-mounted roller mechanism, in order to guarantee an effective and reliable interruption of the air flow.

An optimum adjusting possibility of the respective roller to the associated separating plates is given through a pair-wise arrangement of the rollers. If a suitable roller setting or a suitable roller diameter is set, these can come into contact at the roller surfaces opposite to the inside surfaces of the separating plates. The resulting bearing loads of the roller pressure against the separating plates are cancelled out in this way and do not strain the bearing.

The corn release at the separating plate is improved if the rollers have elevations matching the holes of the separating plates. Through the recesses in the spaces of the roller elevations matching the elevations opposite roller pairs can also engage positively at their previously described rear contact surface and form a positive drive of the rollers to one another in dependence on the offset hole spacing of the respective separating plates.

A further advantageous embodiment of the invention provides that the separating air supply serves at the same time as seed conveying air, therefore that one and the same air flow acts as supply air into the seeding heart, for accumulating seed at the holes and/or for discharging the seed in the direction of the sowing coulter. Advantageously therefore this air flow is used three times in an ideal case. Namely as seed conveying supply air from a central storage container for the seeding hearts, then for accumulating the seed at the holes of the separating plates and finally a third time for discharging the seeds from the seeding heart to the sowing coulters.

The fact that the outlets have a tapering extension in their inner end towards the separating plates is to be understood as a further suggestion with regard to great precision when discharging the seed from the seeding heart. The tubes on the inside of the outlets reduce losses through this additional measure and enable great precision thanks to the tapering and thus streamlined designed tube.

For the formation of the separating plates arranged in pairs it is provided that there are guides between the holes serving the accumulation of seeds to improve accumulating. These guides have a double function in that on the one hand they facilitate the collection and accumulation of the seeds through the larger available area. On the other hand, more accurate release on interruptions to the air supply and more precise discharge into the outlets can be guaranteed. Because of the offset in a tangential direction by half the spacing between the holes, with the plate pair there is always a hole on a plate of a guide on the opposite.

The guides that serve to improve the accumulation have a recess corresponding to the shape of the outlets or are shaped correspondingly. In order to guarantee where possible frictionless transition without loss between the separating plates and the outlets, the guides should have a recess matching the outlets and/or the shape of the guides should be coordinated to the outlets including taking the fact into account that the separating plates turn with a comparatively high speed when the seeds are released in the direction of the outlet.

A further proposal provides that the guides are designed as guide edges expanding and extending in the direction of the outer edge of the separating plate. These edges extend preferably on the slanted outer section of the plate and expand until they come to an end at the outer edge of the plate.

For the arrangement of the seeding hearts themselves it is provided on the one hand that a seeding heart is assigned in each case to a rows unit with two double disc pairs. This means, as already mentioned several times, that in each case one coulter from the seeding heart is supplied with seed by a plate and the other by the corresponding facing plate.

In accordance with another version, a separating plate of the seeding heart has a hub element or a flange surface for receiving a drive flange and the opposite plate has an opening to build up a pressure difference, so that this solution manages as well without two mechanically coupled hearts. This means that an advantageously exact discharge of seed is possible in a simple housing.

A further embodiment of the invention provides that the opening of the plate, which is intended to develop a pressure difference, is designed at the same time as a cutout for fastening the interior mechanism for interrupting the air flow. At the same time, the opening of the plate, which is intended to develop a pressure difference, can be designed as a cutout. For example, an exhaust air line that penetrates through the plate opening into the interior space formed by the plate can serve at the same time as a bearing bracket for the air interruption mechanism. A support arm for this mechanism can also penetrate through the opening into the plate interior space.

As far as the drive of the separating device is concerned, it is proposed that a drive motor is assigned to the seeding heart that is aligned axially to the plate's rotation axis. This positioning enables above all the seed discharge to be made more precise through the arrangement of the separating device in proximity to the depositing device in rows.

The invention is characterised in particular in that a seeding heart is produced for a pneumatic precision seed drill that satisfies the highest requirements with regard to speed and quality, in particular in the production of spread seed rows. A spread seed row can be explained in that, along with practically even longitudinal spacing, seeds placed down in this row have a defined lateral clearance from the middle of the row alternating right and left. Particularly advantageous in this context is a pair of separating plates as a separating device that are connected offset to each other at the outer edge tangentially by a half hole spacing. In interplay with an allocation of a respective plate to a separate outlet for discharging the seeds in the direction of the sowing coulter, this means that an optimal spread seed row can be formed. The air flow is used equally for several purposes, namely to feed air into the seeding heart, to accumulate seeds at or in the holes in the plate and finally to discharge the air together with the seeds through the outlets in the direction of the sowing coulter.

Further details and advantages of the object of the invention can be seen in the following description of the appropriate drawing, which shows a preferred design example with the necessary details and individual parts.

DETAILED DESCRIPTION

Figure 1:
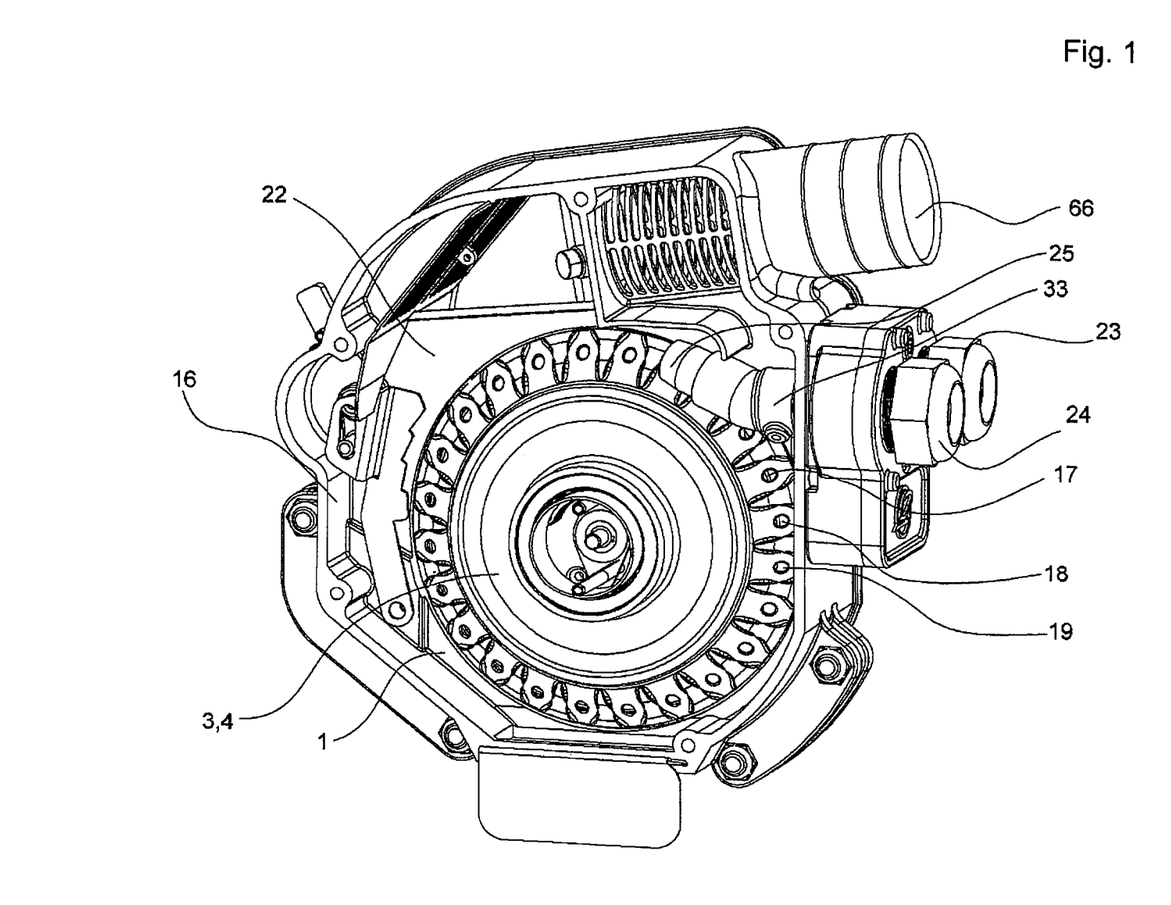
FIG. 1 Shows a perspective view of a seeding heart,
FIG. 2 Shows a side view,
FIG. 3 Shows a front view,
FIG. 4 Shows a separating plate,
FIG. 5 Shows a variant of FIG. 4,
FIG. 6 Shows the section A-A in accordance with FIG. 5 and
FIG. 7 Shows the rear view of a separating plate.

FIG. 1 shows a seeding heart 1 with the supply air inlet 66, through which the supply air containing the seed reaches the seeding heart 1, more precisely the outer space 22 of the plates. This is carried out for example with a blower via a pipe system into supply air inlet 66. Supply air can also be drawn in as well with a vacuum in the housing 16. The housing 16 of the seeding heart 1 serves above all to hold the separating device 3 in the form of the pair of separating plates, of which only the one on the right, numbered 4, can be seen here. This comparatively small separating device 3 can be accommodated completely in the housing 16, which enables a particularly effective use of compressed air to produce a pressure gradient. For example, four holes in the separating device 3 are numbered 17, 18, 19 and 20. From here, seed that is released because of an interruption to the air flow in the end passes through the two outlets 23, 24 in the direction of the sowing coulters not shown here. For the purpose of more precise transfer of the seed, the outlets 23, 24 have pipes that serve to extend them. The pipe 33 that is assigned to the outlet 24 can be seen in FIG. 1. Elastic lines that are not shown are in contact with the outlets 23, 24 and pass the seed from the outlets into the sowing coulters, which are preferably arranged in pairs in a movable frame.

Figure 2:
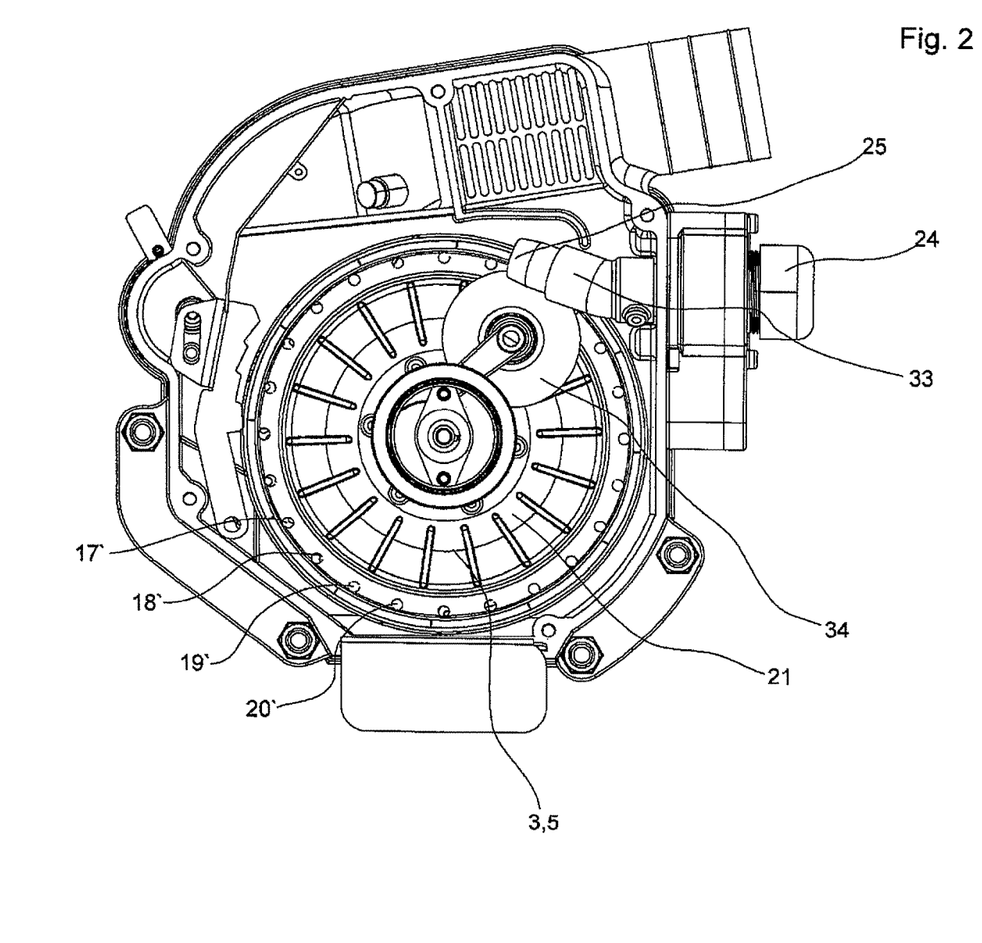

FIG. 2 permits a view of the interior 21 of the separating plate 5. Along with the holes 17', 18, 19', 20' the mechanism 34 for interrupting the air flow, in this case a wheel 35 can be seen supported on an arm 67. If this wheel 35 comes into contact from the inside with the holes 17'-20' etc., the air flow is interrupted. The pipe 33 for discharging the seed in the direction of the sowing coulters, which are not shown, that serves as an extension to the outlet 24 can also be seen in FIG. 2. This pipe 33 tapers at its end 25 towards the plate 5, so that a smooth and low-loss transfer of the seeds between plate 5 and pipe 33 is guaranteed where possible.

Figure 3:
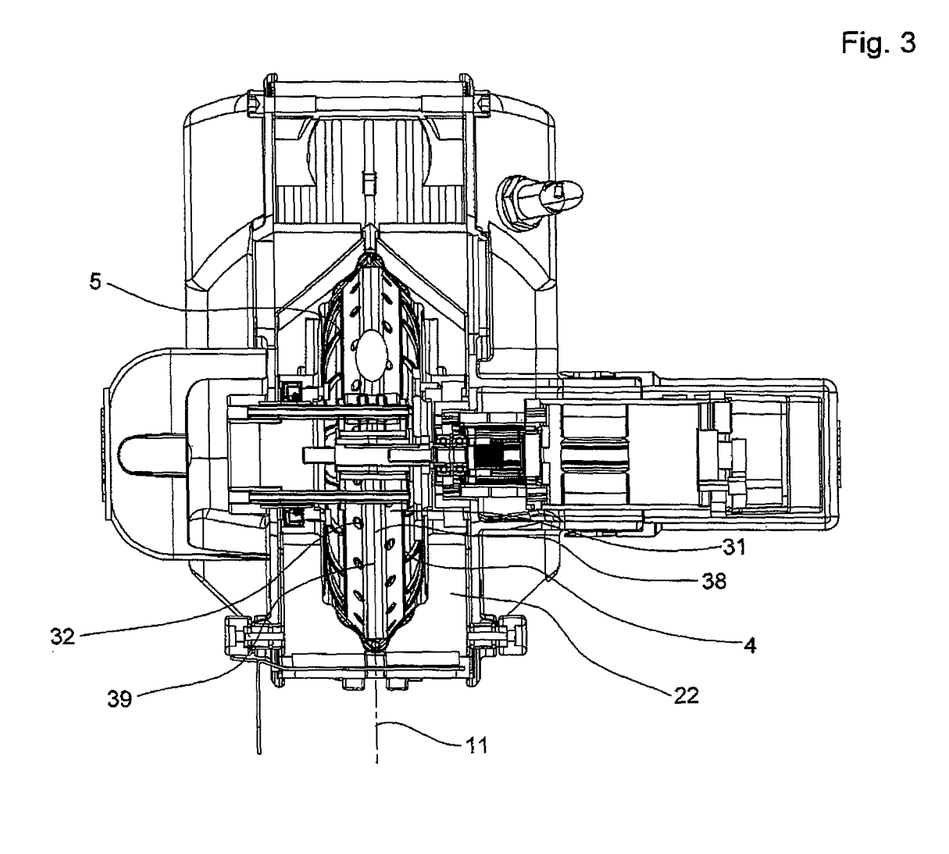

FIG. 3 illustrates in particular the structure of the separating device 3. In this variant of the invention this is formed by pair of separating plates 4, 5, that rotate in the rotation plane 11, i.e. around the rotation axis 70 and are connected to each other tangentially directly offset with their outer edges 38, 39. The separating plates 4, 5 each have an internal section 29 arranged parallel to the rotation plane 11 and an inclined section 30, which at the same time forms the circumferential surface or merges into this. The above-mentioned offset corresponds to half the spacing between two holes, which corresponds to the creation of a spread seed row.

Figure 4:
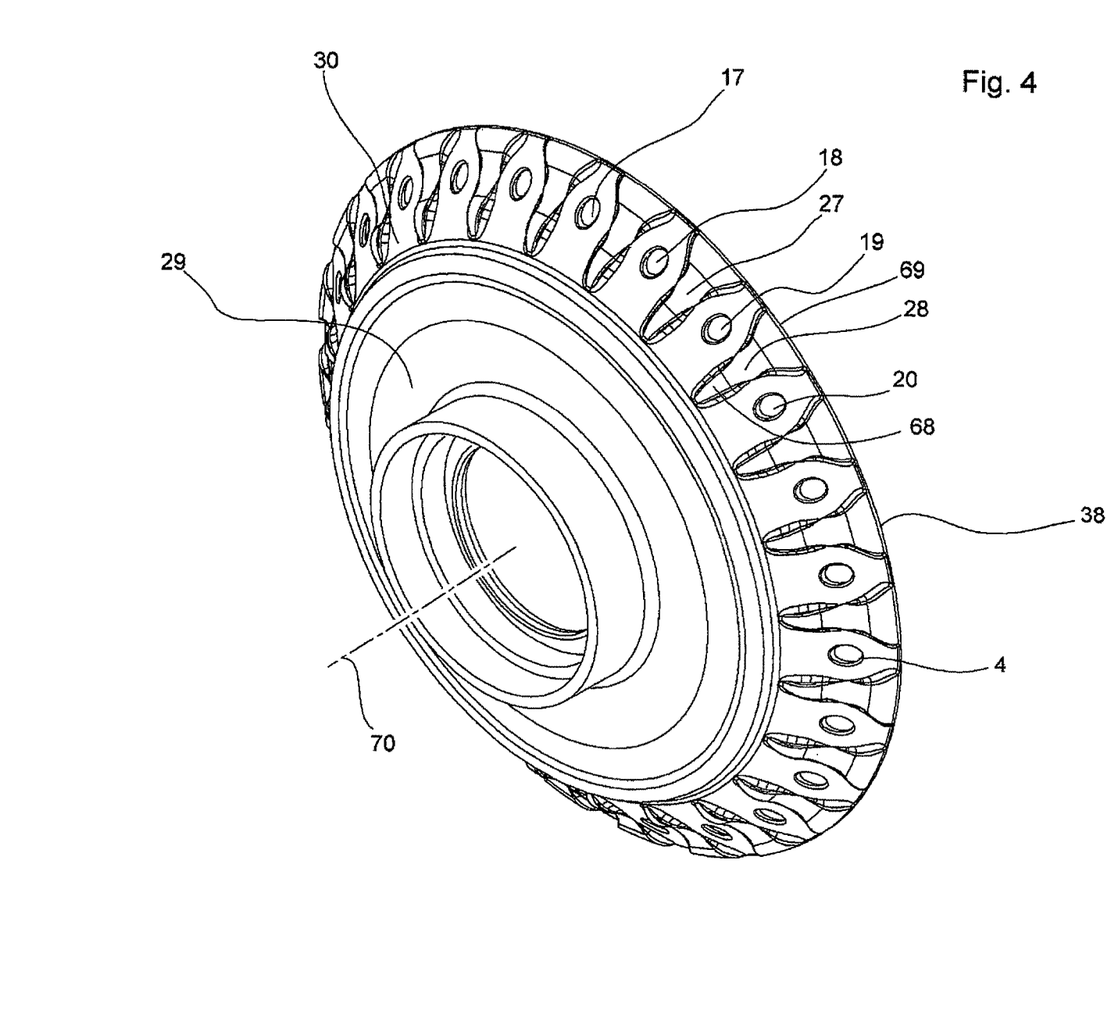

FIG. 4 shows a separating plate 4 with a great multiplicity of holes, of which four are numbered 17-20 as examples. At the end face 13 of the separating plate 4, the internal section 29 and the inclined section 30, which holds flank-shaped guides between the holes 17-20, two of which are numbered 27 and 28 here, runs parallel to its rotation plane 11. A guide 28 of this type extends from the internal end 68 in the direction of the external end 69 increasing in its width up to the outer edge 38 of the separating plate 4. The offset is naturally not shown here, which is selected so that in each case a hole on the one separating plate 4 is opposite to a guide on the correspondingly designed separating plate.

Figure 5:
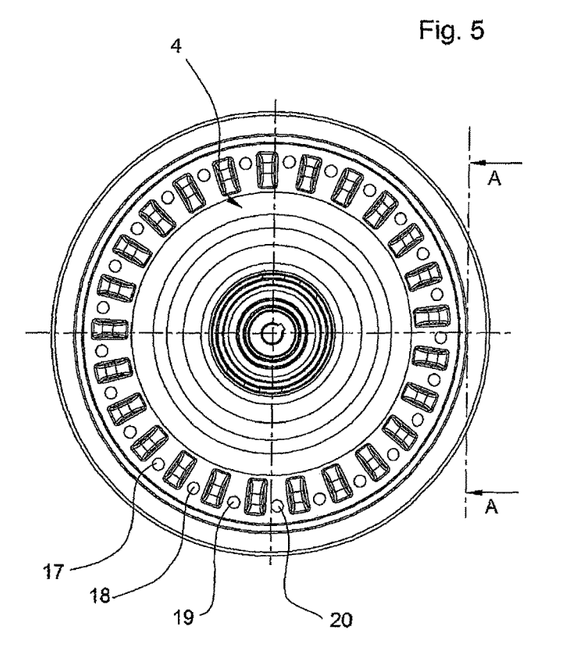

FIG. 5 shows a separating plate 3 in a further variant, whose end face 13, which runs in or at least approximately parallel to the rotation plane 11, has the holes 17, 18, 19, 20.

Figure 6:
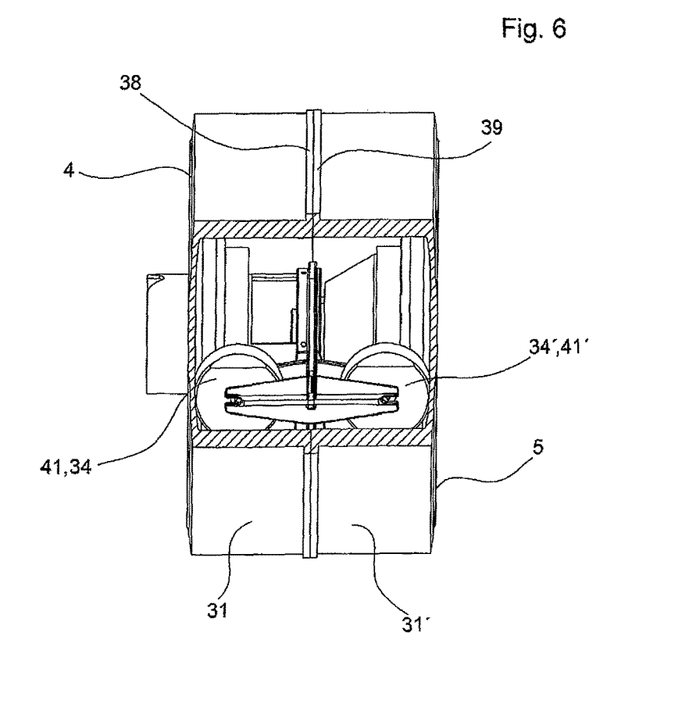

In the section A-A in accordance with FIG. 5 the inner workings of the separating device for this embodiment of the invention are shown in FIG. 6. The separating plates 4, 5 extend in their axial direction in the area of the outer wall 31, 31' on the circumference, where they impinge on each other at their outer edges 38, 39. The mechanism for the air interruption in the form of the rollers is marked 34, 34'.

Figure 7:
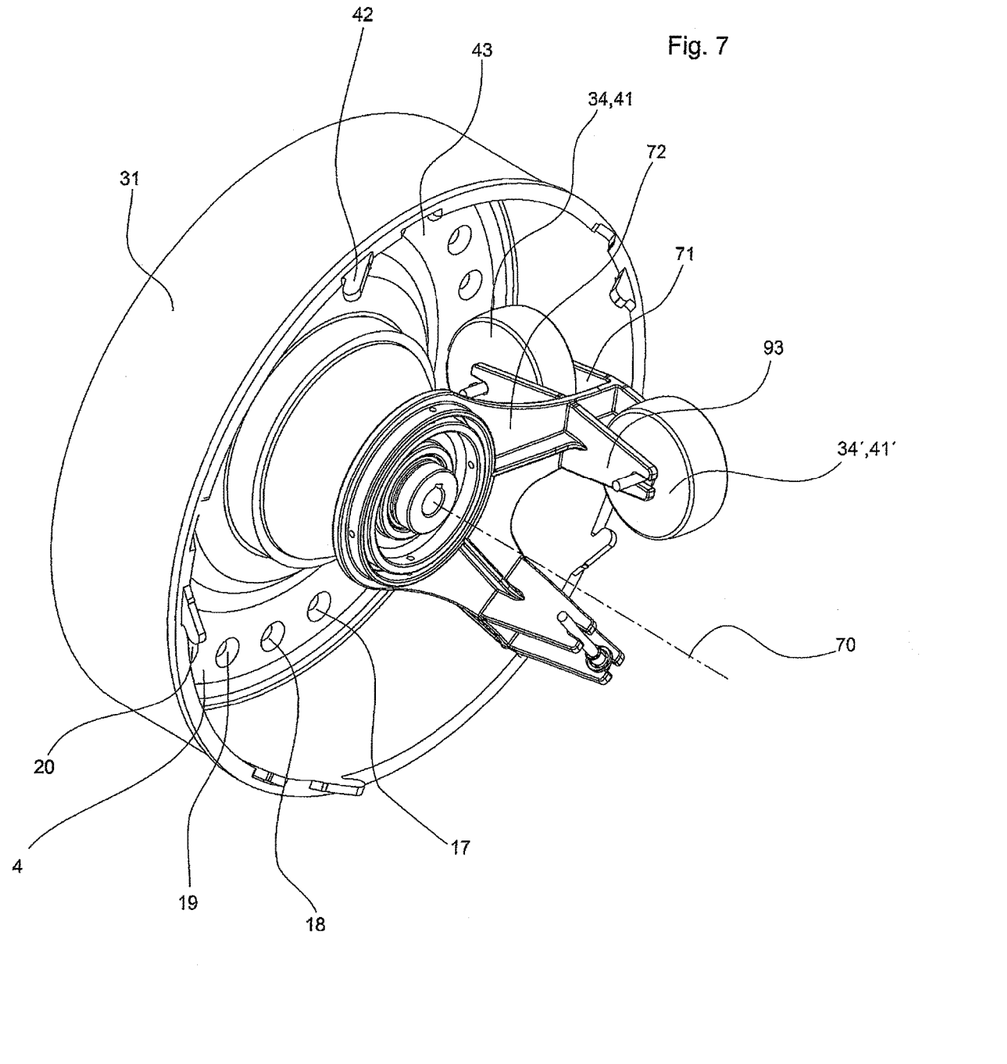

Finally, FIG. 7 makes clear the effect of the mechanism 34, 34' together with the support arms 71, 72, 73 on contact with the holes 17-20. These are positioned without exception in the end face 13 of the separating plate 3. Over the outer wall 31 on the circumference the plate 3 extends in the direction of the rotation axis 70. As an example, one of several fasteners that are characterised in interaction with den holes 17-20 is marked 42. The offset arrangement of the separating plates 4, 5 opposite the holes 17-20 is dictated by the positioning of these fasteners 42 and the corresponding mountings 43 for them.

The invention claimed is:

1. A pneumatic precision seed drill comprising:
   a plurality of seeding hearts (1) for holding pivoting separating devices (3) exposed to a pressure difference between an inner space (21) and an exterior space (22) and having a multiplicity of holes (17, 18, 19, 20) serving for the accumulation of seeds, wherein
   the separating device (3) is formed by a pair of separating plates (4, 5) connected to one another at their outer edge (38, 39) and are arranged offset in a tangential direction to one another to produce a spread seed row and are assigned to separate outlets (23, 24) for the discharge of the seed from the seeding heart (1) for sowing, and
   compressed air is used to produce the pressure difference.

2. A Seeding heart (1) for a pneumatic precision seed drill for holding pivoting separating devices (3) exposed to a pressure difference between an inner space (21) and an exterior space (22) and having a plurality of holes (17, 18, 19, 20) serving for the accumulation of seeds, wherein
   the separating device (3) is formed by a pair of separating plates (4, 5) connected to one another at their outer edge (38, 39) and are arranged offset in a tangential direction to one another to produce a spread seed row and are assigned to separate outlets (23, 24) for the discharge of the seed from the seeding heart (1) for sowing, and
   compressed air is used to produce the pressure difference.

3. The pneumatic precision seed drill in accordance with claim 1, wherein the two separating plates (4, 5) are arranged offset to one another to an extent that corresponds to half the spacing between two holes (17, 18, 19, 20).

4. The pneumatic precision seed drill in accordance with claim 1, wherein the separating plates (4, 5) have an inside section (29) running at least approximately parallel to the rotation plane (11) of the plates (4, 5) and an outer section (30) arranged slanted and having the holes (17, 18, 19, 20).

5. The pneumatic precision seed drill in accordance with claim 1, wherein
   the separating plates (4, 5) have an end face (13) running parallel to the rotation plane (11) of the plates (4, 5) and having the holes (17, 18, 19, 20).

6. The pneumatic precision seed drill in accordance with claim 1, wherein
   pipes connected to central spacing of the outlets (23, 24) corresponds at least approximately to lateral spacing of the spread seed row that is to be produced.

7. The pneumatic precision seed drill in accordance with claim 1 wherein
   the separating plates (4, 5) can be connected in pairs via fasteners (42) in such a way that the holes (17, 18, 19, 20) provided in facing separating plates (4, 5) are aligned offset to one another in the assembled condition.

8. The pneumatic precision seed drill in accordance with claim 1 wherein
   the pair of separating plates (4, 5) are fitted with an interior mechanism (34, 35) for interrupting the air flow.

9. The pneumatic precision seed drill in accordance with claim 8, wherein
   the interior mechanism (34, 35) for interrupting the air flow is realised as a spring-mounted or at least partly elastic roller or as a spring-mounted roller mechanism.

10. The pneumatic precision seed drill in accordance with claim 9, wherein
the interior mechanism (34, 35) for interrupting the air flow is realised as at least a pair of spring-mounted or at least partly elastic rollers (41) or as a spring-mounted roller mechanism, whereby in each case one roller (41) of the roller pair is assigned to the respective inner surface of the separating plate (4, 5).

11. The pneumatic precision seed drill in accordance with claim 9, wherein
the interior mechanism (34, 35) for interrupting the air flow is realised as at least a pair of spring-mounted or at least partly elastic rollers (41) or as a spring-mounted roller mechanism, whereby the rollers (41) of the roller pair are in contact on the side opposite at the respective inner surface of the separating plate (4, 5).

12. The pneumatic precision seed drill in accordance with claim 9, wherein
the interior mechanism (34, 35) for interrupting the air flow is realised as a spring-mounted or at least partly elastic roller (41) or as a spring-mounted roller mechanism whereby the roller has elevations that engage at least party positively into the holes (17, 18, 19, 20).

13. The pneumatic precision seed drill in accordance with claim 1, wherein
an air flow serves as supply air in the seeding heart (1) for accumulating the seed at the holes (17, 18, 19, 20) and/or for discharging the seed in the direction of the sowing coulter.

14. The pneumatic precision seed drill in accordance with claim 1, wherein
the outlets (23, 24) have a tapering extension (33) at their end (25) towards the separating plates (4, 5).

15. The pneumatic precision seed drill in accordance with claim 1, wherein
guides (27, 28) to improve accumulation are arranged between the holes (17, 18, 19, 20) serving for the accumulation of seeds.

16. The pneumatic precision seed drill in accordance with claim 15, wherein
the guides (27, 28) have a recess corresponding to the shape of the outlets (23, 24).

17. The pneumatic precision seed drill in accordance with claim 15, wherein
the guides (27, 28) are designed as guide edges extending in the direction of the outer edge (38) of the separating plate (4).

18. The pneumatic precision seed drill in accordance with claim 1, wherein
one seeding heart (1) is assigned to a row unit.

19. The pneumatic precision seed drill in accordance with claim 1,
wherein one separating plate (4) of the seeding heart (1) has a hub element or a flange surface for holding a drive flange and an opposite plate (5) has an opening for building up a pressure difference.

20. The pneumatic precision seed drill in accordance with claim 1,
wherein an opening of the plate (5) is provided for building up a pressure difference and is designed to act as a cutout for fastening the interior mechanism (34, 35) and for interrupting the air flow.

21. The pneumatic precision seed drill in accordance with claim 1, wherein
a drive motor is aligned axially to the rotation axis (70) of the plates (4, 5) to drive the seeding heart (1).

* * * * *